United States Patent
Behnke et al.

[19]
[11] Patent Number: 6,146,268
[45] Date of Patent: Nov. 14, 2000

[54] SENSOR FOR HARVESTING MACHINES

[75] Inventors: Willi Behnke, Steinhagen; Ralf Hübner; Wolfram Damm, both of Dresden; Harald Müller; Gerd Bernhardt, both of Dresden, all of Germany

[73] Assignee: Claas Selbstfahrende Erntemaschinen GmbH, Harsewinkel, Germany

[21] Appl. No.: 09/097,238

[22] Filed: Jun. 12, 1998

[30] Foreign Application Priority Data

Jun. 13, 1997 [DE] Germany .......................... 197 25 028

[51] Int. Cl.[7] .......................... A01D 75/18; A01D 75/28; A01F 12/16; A01F 21/00
[52] U.S. Cl. .................. 460/4; 460/5; 56/10.2 C
[58] Field of Search .......................... 56/10.2 B, 10.2 C, 56/10.2 D, DIG. 15; 460/4, 5, 7

[56] References Cited

U.S. PATENT DOCUMENTS

| | | | |
|---|---|---|---|
| 3,563,013 | 2/1971 | Elfes | 460/5 |
| 3,606,745 | 9/1971 | Girodat | 460/5 |
| 3,939,846 | 2/1976 | Drozhzhin et al. | 130/27 R |
| 4,036,065 | 7/1977 | Strelioff et al. | 73/432 R |
| 4,149,415 | 4/1979 | Harbour | 460/5 |
| 4,230,130 | 10/1980 | Staiert | 130/27 R |
| 4,259,829 | 4/1981 | Strubbe | 460/5 |
| 4,266,421 | 5/1981 | McDougal | 73/1 |
| 4,393,704 | 7/1983 | Bartko | 73/432 R |
| 4,481,756 | 11/1984 | Schartz | 460/5 |
| 4,490,964 | 1/1985 | Eldredge | 460/5 |
| 4,517,792 | 5/1985 | Denning et al. | 56/10.2 |
| 4,540,003 | 9/1985 | Osselaere | 130/27 T |
| 4,902,264 | 2/1990 | Diekhans et al. | 460/5 |
| 5,015,997 | 5/1991 | Strubbe | 340/684 |
| 5,046,362 | 9/1991 | Strubbe | 73/579 |
| 5,312,299 | 5/1994 | Behnke et al. | 460/5 |

FOREIGN PATENT DOCUMENTS

| | | |
|---|---|---|
| 00 93 991 A1 | 5/1983 | European Pat. Off. . |
| 03 39 142 B1 | 4/1988 | European Pat. Off. . |
| 22 03 221 | 1/1972 | Germany . |
| 24 48 745 C2 | 10/1974 | Germany . |
| 28 02 679 A1 | 1/1978 | Germany . |
| 30 31 812 C2 | 8/1980 | Germany . |
| 37 31 080 A1 | 9/1987 | Germany . |
| 37 31 080 C2 | 9/1987 | Germany . |
| 38 33 363 C2 | 9/1988 | Germany . |
| 41 04 179 C2 | 2/1991 | Germany . |
| 42 35 809 C1 | 10/1992 | Germany . |
| 91 15 701 U1 | 12/1992 | Germany . |
| 196 12 540 A1 | 3/1996 | Germany . |

*Primary Examiner*—Thomas B. Will
*Assistant Examiner*—Arpad Fabian Kovacs
*Attorney, Agent, or Firm*—Husch & Eppenberger, LLC; Robert E. Muir; H. Frederick Rusche

[57] ABSTRACT

The invention relates to a sensor for determining the structure-borne sound vibrations generated by the impingement of grains on a pulse detector in an agricultural machine for harvesting crops and to a device for operational monitoring of the sensor and improved signal evaluation.

Such sensors are used to monitor threshing and separating performance at various points in a harvesting machine. Depending on the area of application, various forms of a pulse detector are used. These can have the shape of a plate, a tube, a rod or other similar profiles. Attached to these detectors are vibration detectors. A particularly strong connection between the vibration detector and the pulse detector is achieved by using a piezo-ceramic vibration sensor and its attachment by means of a screw connection.

25 Claims, 4 Drawing Sheets

SENSOR FOR HARVESTING MACHINES

BACKGROUND OF THE INVENTION

The present invention relates generally to agricultural machinery and, more particularly, to improvements to harvesting machines. The improvement relates specifically to a sensor for detecting structure-borne noise vibrations, which are generated by the impingement of harvested material on a pulse detector, and to means for improving and monitoring the operation of the sensor.

A sensor is known from German Patent 24 48 745. To measure the lost grains at the discharge ends of straw walkers and in grain separation or cleaning devices, steeply inclined pulse detector plates are attached via damping members over the entire conveyor width. An elector-acoustic converter is attached to the underside of these plates by means of a spring clamp. The residual or lost grains present in the flow of material drop onto the pulse detector plates and cause vibrations, which the pulse detector plates convey to the electro-acoustic converter. The plates are connected via the converter casing to a microphone and convert the vibrations into an electrical signal. The vibrations are transmitted over a plurality of coupling points. Due to its construction and the manufacturing steps entailed therewith, as well as the influences of corrosion, dirt and other items, each coupling point represents a weak point in the sensor. The signal sensitivity of this sensor is therefore inconsistent and is subject to fluctuations determined by aging.

Another loss sensor is known from German Patent 37 31 080. This sensor has only one coupling point. A piezo quartz is attached directly to the counter side of the pulse detector surface. The connection between the piezo quartz and a striker surface is produced by means of a soldering or adhesive point. This connection has at least a few serious drawbacks. When there are large mechanical or thermal stresses on the pulse detector surface, such as those which may occur during cleaning, adjustment or repair of the screens or walkers, the property of the adhesive or soldered connection to couple sound vibrations is altered. Furthermore, with such a connection, aging phenomena are of importance. These alterations are difficult to understand or detect and require the intervention of a specialist for their monitoring. Under certain circumstances, the connection may be destroyed by foreign bodies impinging on the striker surface. Reinstatement of the connection requires complete dismantling and recalibration of the sensor. Therefore for reasons of time and technical skill, in most cases of breakdown the entire sensor is changed, which leads to unnecessary costs.

There is known from the European Patent 0 339 142 a sensor which has a plurality of coupling points. In this sensor the converter is inserted between two plates, using a plurality of elastic components and a signal damping layer, and are screwed together by means of a plurality of screws. This converter pack is then brought into contact by an additional screw connection to the actual pulse detector. The screw connections must be so disposed that the converter is not exposed to any stresses, and abuts flat on the contact plates 35. Therefore the converter pack and the converter are screwed together, but with a space between the two. A consequence of this is a large connecting area between the converter pack and the pulse detector. Influences such as dust, deformations in the pulse detector and moisture, or a changeover of converter, may alter the connecting surfaces. The larger the connecting surfaces, the less reliable the prediction of the actual size of the connecting surfaces. It therefore cannot be predicted how large the connecting surfaces are at any moment. The signal sensitivity is inconsistent and it cannot be ensured over the duration of the full life of the device. The construction and attachment is extremely complicated, requiring the assistance from a specialist during first assembly and repair.

Furthermore, no methods or means are known by which the operation of the sensor can be monitored. Object underlying the present invention are therefore to provide a sensor of the type already described, which removes the described drawbacks, has defined coupling points between the pulse detector and the piezo electric converter, and is of a simple and reliable construction.

SUMMARY OF THE INVENTION

The above objects are achieved by a sensor for monitoring the threshing and separating performance and harvesting losses, the sensor having a pulse detector and a piezoelectric vibration sensor for measuring structure-borne vibrations.

In another feature the vibration sensor is brought into contact with the pulse detector by a mechanical connection, such as a screw connection for example. A coupling point is created by the tightening moment of a screw, which is present between the pulse detector and a converter. The coupling area of the connection is relatively small in comparison to prior solutions. This small connecting area and a defined surface pressure eliminate the known problems of coupling points. This type of connection is unique in that it lacks damping members.

According to another aspect of the present invention there is provided a harvesting machine for harvesting agricultural crops and having a threshing mechanism and a separating mechanism, a sensor for monitoring the threshing and separating performance and harvesting losses and including a pulse detector; and a device for operational testing of the sensor and having an evaluating unit with a diagnostic partial range, in which the vibrations of the pulse detector are measured upon a specific stimulation of the pulse detector.

In yet another aspect of the present invention there is provided a harvesting machine for harvesting agricultural crop including a sensor for monitoring an operational parameter of the machine, including the threshing and separating performance, harvesting losses, and traveling speed of the harvesting machine, and generating a signal; and a device for evaluating the sensor signal in conjunction with the throughput of harvested material of the harvesting machine to provide relative harvesting loss information.

The vibration of the pulse detector is introduced directly into the vibration sensor. Due to its inertia, a seismic mass exerts pressure, depending on the amplitude and frequency of the stimulating vibration, on an annular piezo-ceramic component which lies around the coupling connection. The force acting on the piezo-ceramic effects a charge displacement within the piezo-ceramic, and thus produces a measurable electrical voltage between the top and the underside of the ceramic. This voltage is taken off via contact plates and passed to amplifier, filter and integrator circuits.

In a preferred embodiment, the measuring signals are further processed in an electronic evaluation system coupled directly to the vibration sensor casing. Thus signal dampings and signal losses are to a large extent unnecessary.

In another embodiment, the individual evaluation, display and operational testing units advantageously communicate via a communication network. This communication may also be made possible via a bus system, if present on the machine.

The vibration sensor used according to one embodiment of the invention is resistant to industrial climate, water and dust. Therefore uncoupled casing and encapsulating arrangements can be omitted.

For use of the vibration sensor in conjunction with a striker plate pulse detector, an even more reliable connection or more uniform surface pressure is achieved because the screw head of the connecting screw is of roughly the same diameter as the coupling surface and the underside of the screw head connects the striker plate pulse detector in a flat manner with the vibration sensor.

In yet another embodiment, the pulse detector can be reinforced at and around the coupling point in such a way that a threaded bore can be introduced into the coupling point, with the sensor being secured by means of a screw.

The low coupling surface desired has an advantageous effect on the range of operation of the vibration sensor and can be used on various types of pulse detectors. In addition to its use on a striker plate, it is also possible to use the low coupling surface on a pulse detector tube or rod with any cross-sectional shape. Thus there are various possibilities of connecting the pulse detector to the vibration sensor.

In order to attach the vibration sensor to the end face of a pulse detector tube, the diameter of the pulse detector is selected so that an adapter with a threaded bore or a threaded pin can be inserted into the end faces, and thus the pulse detector can be screwed directly into the vibration sensor.

If a rod is used as a pulse detector, it is advantageous to select a rod with a diameter greater than the screw diameter predetermined for the connection. The rod end is then tapered to the desired thread diameter and provided with a thread. At the point of reduction of the diameter there is an annular surface which, upon connection to the vibration sensor, serves as a coupling surface.

In all cylindrical pulse detectors with diameters smaller than the screw diameter and with the vibration sensor attached to the end face, the arrangement according to the invention is such that the diameter of the pulse detector is widened at its ends. This widening is then advantageously located outside the measuring range of the sensor.

The construction of the coupling point can be widened at will; in this case only a few possible connections will be named by way of example. The pulse detector can be connected to the vibration sensor by a specially shaped structural part, by a flat end of a pulse detector or also by a curved end of a pulse detector, which merges directly into a connecting part.

An additional advantage of the invention is the simplicity with which the sensor attaches to the harvesting machine.

It is known in the art to connect a sensor to the harvesting machine via vibration dampers. This attachment damps the vibratory performance of the pulse detector. It has therefore proved particularly advantageous to use the vibration-sensor as a connecting member between a vibration damper and the pulse detector. The vibration damper is then connected to the harvesting machine via a securing means. The vibration sensor then, in addition to determining structure-borne noise vibrations, also takes over part of the function of securing the pulse detector in the harvesting machine.

Another embodiment according to the invention enables the connecting member between the pulse detector and the vibration sensor to be connected to the harvesting machine via vibration damping material, such as a rubber bushing socket. A structural part, which permits a certain spacing between the pulse detector and the vibration sensor, can also serve this purpose.

BRIEF DESCRIPTION OF THE DRAWINGS

The invention will now be explained in more detail with reference to the drawings which illustrate the best known mode of carrying out the invention, and wherein.

DETAILED DESCRIPTION

Figure 1:
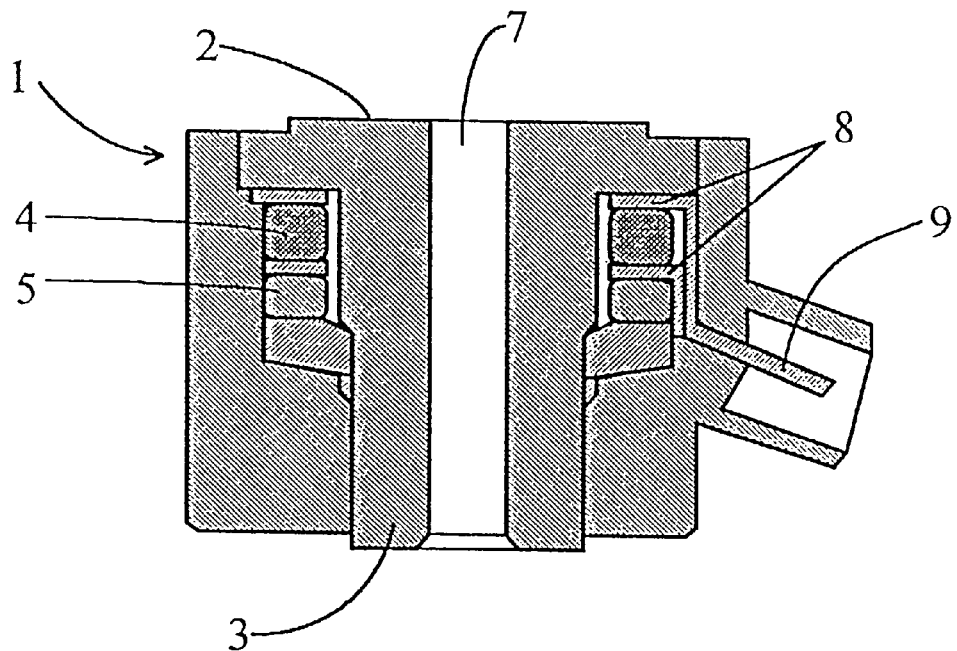
FIG. 1 is a schematic view of a vibration sensor.

FIG. 1 is a schematic view of a vibration sensor 1 which can be directly connected to a pulse detector (various embodiments of which are hereafter described) via the vibration sensor's bore 7. Vibrations are generated by means of particles of harvested material dropping onto the pulse detector, e.g. 10, which are transmitted via a coupling surface 2 directly into the vibration sensor 1. The coupling surface 1 is one means for communicating the pulse detector with the piezoelectric vibration sensor, the coupling surface 1 may also act in concert with a structural part 29, as discussed below, for communicating the pulse detector with the piezoelectric vibration sensor. A metal sleeve 3 transmits the vibration to a piezo-ceramic ring 4 provided on both sides with contact rings 8. Due to the inertia of the mass 5 located above the piezo-ceramic ring 4, forces are exerted in the rhythm of the vibrations on the piezo-ceramic 4. These forces produce a displacement in the piezo-ceramic 4, and thus produce a measurable electrical voltage between the top and bottom of the ceramic. The electrical voltage is taken off via the contact ring 8, and are available as a measurement signal at the plug-in contacts 9. This voltage is passed to amplifier, filter and integrator circuits.

Figure 2:
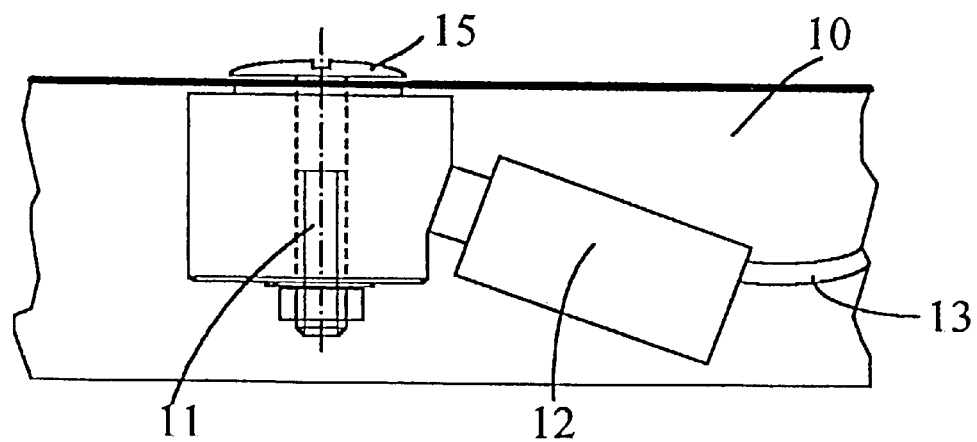
FIG. 2 is a side view illustrating the sensor with a plate-shaped pulse detector and a directly mounted electronic evaluation system.

In FIG. 2, the vibration sensor 1 is screwed directly to a plate-shaped pulse detector 10. The pulse detector 10 is formed by a plate, which extends across part of or the whole width of the separator or threshing unit, and is preferably located vertically to the flow of harvested material. The vibration sensor 1 is screwed by a flat head screw 11 through the bore 7 to the pulse detector 10. The screw head 1 5 has a diameter which corresponds approximately to that of the diameter of the coupling surface, which results in a uniform surface pressure. An electronic evaluation system 12 is coupled directly to the vibration sensor 1, allowing weak measurement signals to be transmitted directly to the electronic evaluation system 12 without notable losses. The measurement signals are then transmitted via the signal line 13 communication network 40, or bus system 41 to a subsequent evaluation unit 12A, operational testing unit 38 or display unit 39.

Figure 3:
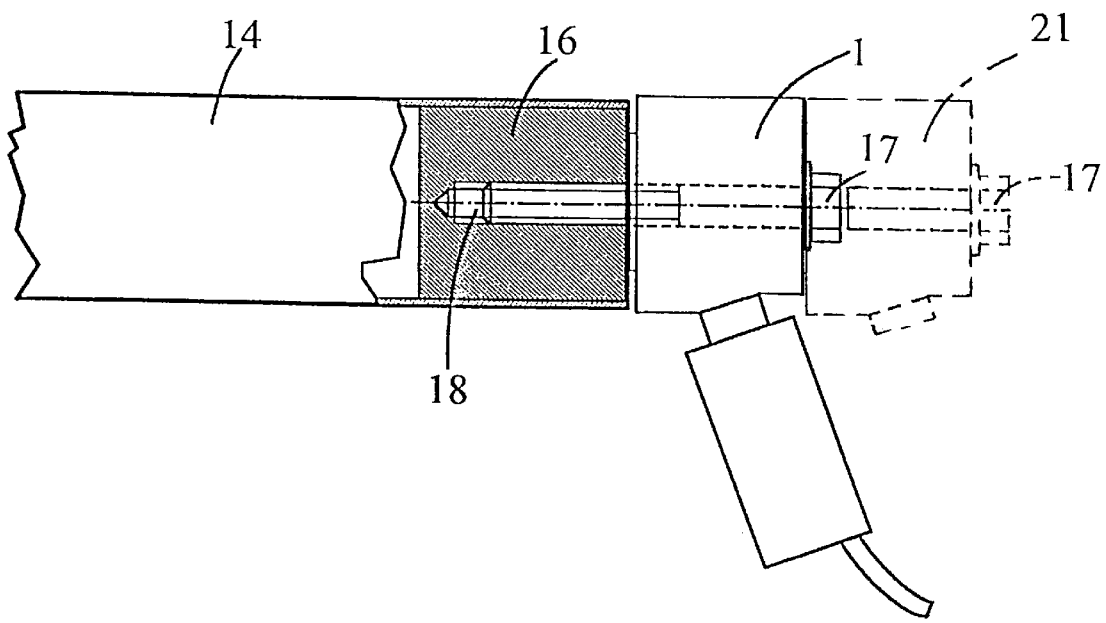
FIG. 3 is view, partly elevational and partly cross-sectional, illustrating the vibration sensor on a tubular pulse detector.

In FIG. 3, the vibration sensor 1 is shown in conjunction with a tubular pulse detector 14. The pulse detector 14 extends over part of or over the totality of the separator or threshing unit width. The pulse detector 14 can also extend beyond the separator or threshing unit width so that the vibration sensor 1 is not exposed directly to the flow of material. An adapter 16, which contains a centrally located bore 18, is pressed into one tube end. The vibration sensor 1 is fastened with the aid of an elongate screw 17 into the bore 18.

Figure 4:
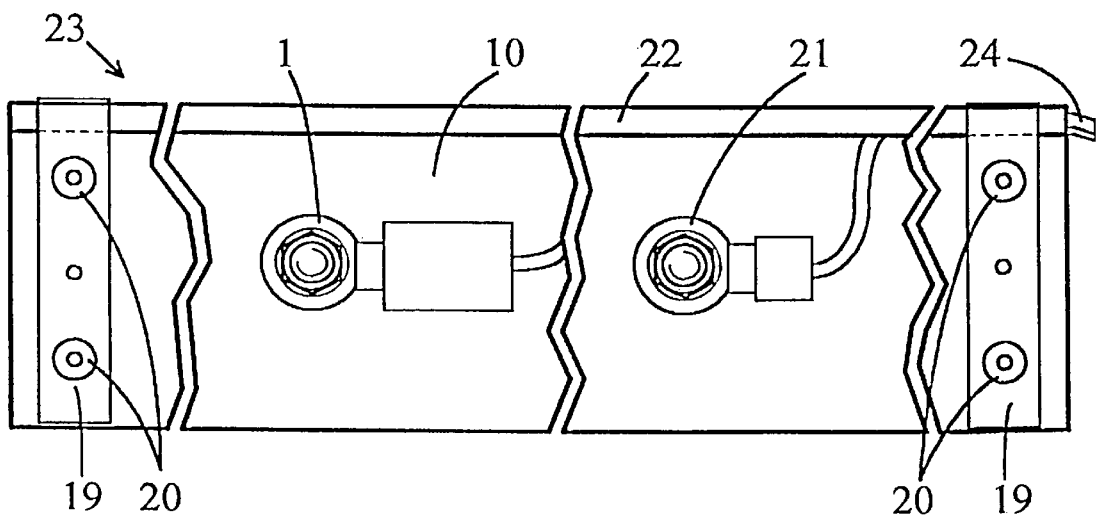
FIG. 4 is a bottom view of the sensor on a plate-shaped pulse detector with an additional pulse emitter mounted on the pulse detector.

FIG. 4 shows the underside of a plate-shaped pulse detector 10 with a mounted vibration sensor 1 and a mounted pulse emitter 21. This arrangement makes it possible to monitor the coupling point between the vibration sensor 1 and the pulse detector 10. The pulse detector 10 is subjected to a specific vibration by means of the pulse emitter 21. The evaluation, operational testing and display units are set to the excitation as known by definition. If the measured value does not lie in the predetermined or programmed desired vibrational range, then an error exists in the sensor system.

Securing members 19 are attached to the ends of the pulse detector 10. These securing members 19 connect the sensor 23 to the harvesting machine by vibration dampers 20. A multiple flange 22, shown at the top of FIG. 4, serves to stabilize the pulse detector 10 and also provides a guide for conductors 24.

Figure 5:
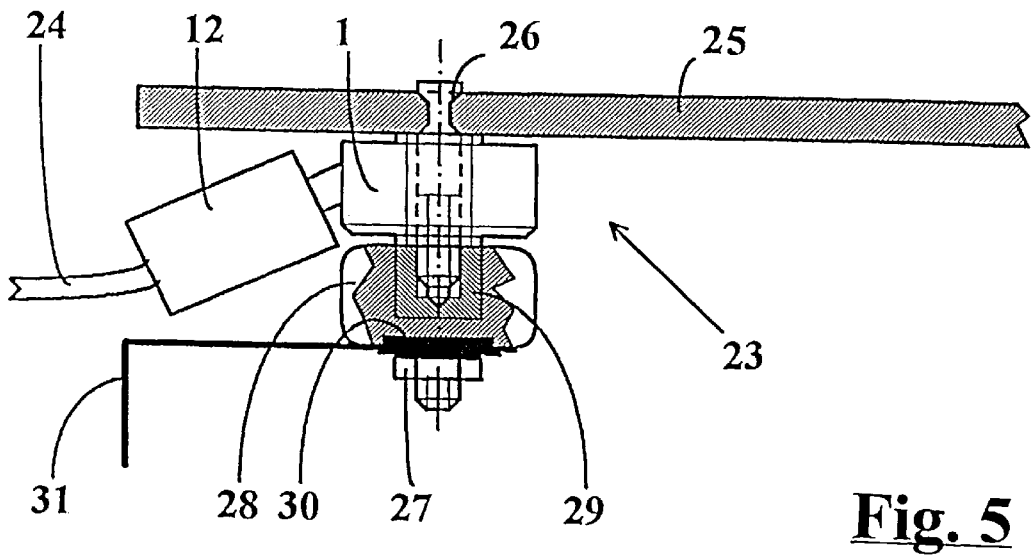
FIG. 5 is a front view of the sensor with a cylindrical pulse detector, and a structural part which is screwed directly to the vibration sensor and to a vibration damper and phandom lines, a pulse emitter attached to the vibration sensor.

FIG. 5 shows a rod-like or cylindrical pulse detector 25 connected directly to a vibration sensor 1 with the aid of a headless screw 26. The headless screw 26 has a bore on its unthreaded end extending vertically to the longitudinal axis of the cylindrical pulse detector 25. The bore provides a means by which the vibration sensor 1 and pulse detector 25 is connected. The headless screw 26 with the pulse detector 25 is thrust through the vibration sensor 1 and screwed to a structural part 29, cast into a vibration damper 28, and provided with an internal thread. The peripheral surface of the pulse detector 25 is connected with a specific surface pressure to the vibration sensor 1 via the tightening moment of this screw connection. A further structural part 30 with a threaded pin is also cast into the vibration damper 28. By means of this threaded pin the sensor 23 can be connected directly to the harvesting machine via a retaining bracket 31. In conjunction with a cylindrical pulse detector 25, it has proven to be particularly advantageous if the coupling point is a direct connection of the vibration sensor 1 with the peripheral surface of the pulse detector 25. As a rule, pulse detectors 25 are inserted vertically to the direction of the flow of the harvested material crop. The pulse detector 25 is then stimulated radially by the material to be measured. This stimulation can be introduced via a structural part directly into the vibration center. The structural part may be, for example, the above described headless screw 26. The pulse detector 25 is secured directly to the vibration sensor 1 by means of the threaded portion on the structural part. The peripheral surface then has direct contact with the coupling surface 2.

Figure 6:
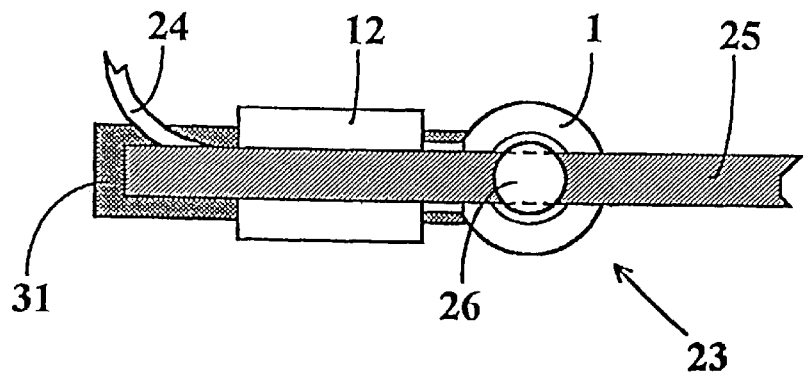
FIG. 6 is a plan view of the apparatus shown in FIG. 5.

FIG. 6 shows a plan view, not to scale, of the sensor 23 with the cylindrical pulse detector 25 also shown in FIG. 5. It can be seen that the sensor 23 can be inserted directly into the flow of harvested crop by reason of its simple, slim construction.

Figure 7:
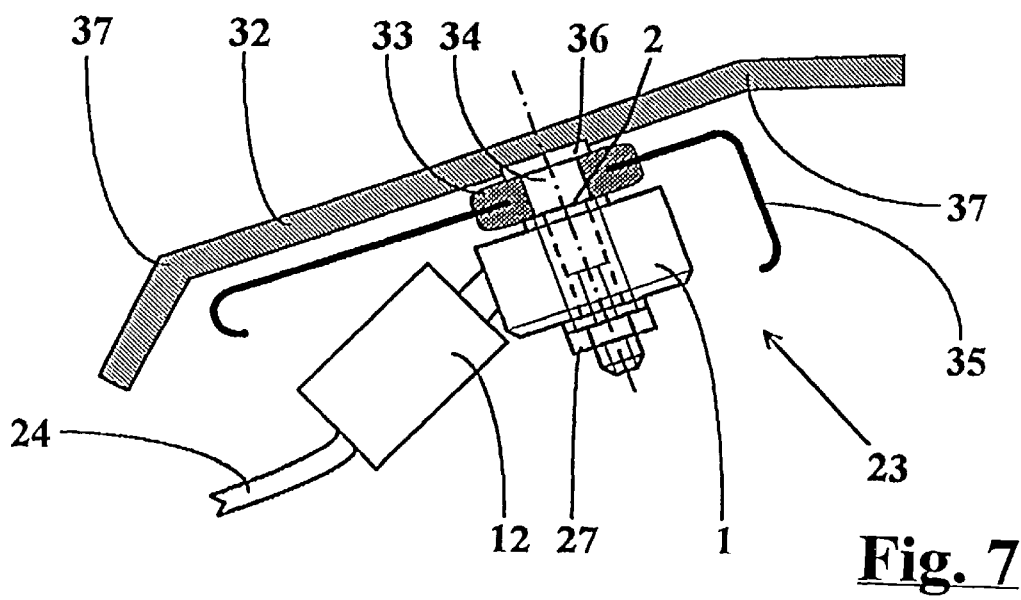
FIG. 7 is a front view similar to FIG. 5, but illustrating the sensor with the pulse detector located in the direction of the flow of harvested material, and a connecting member which is connected to a vibration-damper.
Figure 8:
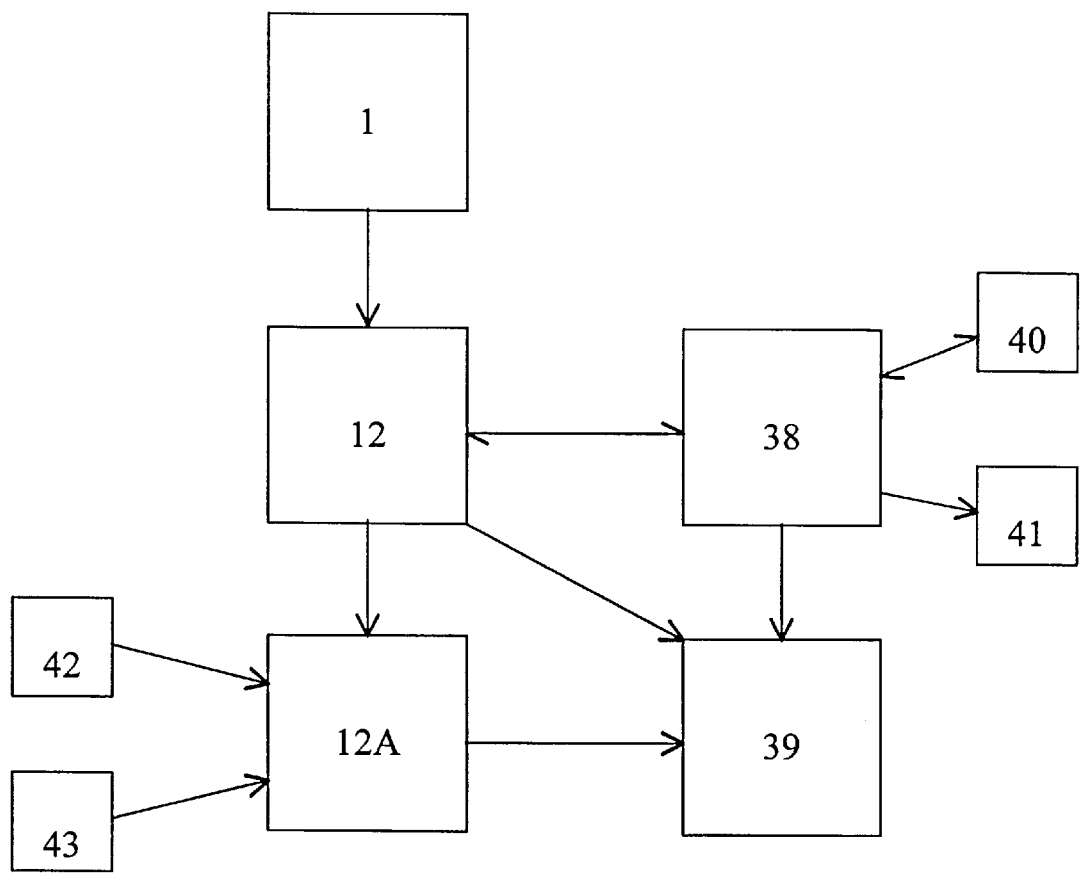
FIG. 8 is a schematic diagram of the electonics of one embodiment.

FIG. 7 shows another way in which the sensor 23 can be attached in a harvesting machine. A pulse detector 32 has an angled end profile with any cross-sectional shape. In this case the pulse detector 32 is located in the direction of the flow of harvested material. The bevels 37 at the ends of the pulse detector 32 prevent any straw or weeds in the flow of harvested crop from being broken up and deposited at the pulse detector 32. A plate 35 is, for example, a guide and stabilizing plate in a mower harvester's cleaning device, aligned in the direction of material flow. It extends over the entire width of the cleaning device and can serve as a securing means for one or more of the sensors 23 according to this embodiment of the invention. The sensor 23 is held in a hole in the plate 35 by a vibration-damping bushing 33 having an internal diameter which is greater than the screw diameter selected for the connection. A structural part 34 is welded, soldered or otherwise fixed directly to the pulse detector 32. The part 34 has a head 36 with a diameter greater than the internal diameter of the socket of bushing 33. The structural part 34 has, over a length shorter than the thickness of the bushing socket 33, a diameter which roughly corresponds to the internal diameter of the bushing socket 33. The structural part then tapers to the screw diameter selected for the connection and terminates in a thread. By means of this thread and a nut 27, the pulse detector is screwed to the vibration sensor. Due to the special design of the structural part 34, the bushing socket 33 is compressed when screwed to the vibration sensor 1. The sensor 23 is thus held on the plate 35 and secured against rotation.

Furthermore, the pulse detector 32 communicates directly with the coupling surface 2 of the vibration sensor 23 via the structural part 34. The single coupling point is particularly advantageous because by means of a single screw connection the sensor 23 can be brought directly into contact with the pulse detector 32. Only one tightening moment need be taken into account during assembly. This type of attachment has the further advantage that the sensor 23 only slightly hinders the flow of harvested material, and the vibration sensor 1 and the mounted electronic evaluation system 12 are effectively protected against contamination.

In accordance with a preferred embodiment of the invention, a device for monitoring the operational capacity of the device is proposed.

The evaluation unit 12 of the vibration sensor 1 signals includes a pass filter. The operational range of the filter is variable and may be preselected for various types of harvested material by means of a preselector circuit. The entire operational range is preferably sub-divided into partial ranges. The arrangement is such that a diagnostic partial range is available where the basic vibrations of the attachment and structure of the sensor 23 can be determined in a defined state of stimulation. The vibrations detected can be intermediately stored in storage means 40 and used as a desired value for further operational tests. The basic vibrations are not automatically stored, which is only carried out after the initial assembly or after any necessary repair to the sensor 23.

If the vibratory behavior of the pulse detector's 32 coupling point changes, the changed basic vibration is detected. When predetermined threshold values are exceeded or not reached, an error message is generated in the desired vibration range. This can be accomplished in optical, acoustic or any other known form by an error message generating means 41.

Further operational testing can be achieved if a defined vibration is applied to the sensor 23. This can be brought about by means of a pulse emitter 21 mounted permanently, or only for testing purposes, on the pulse detector 32 or on the vibration sensor 1. The defined vibration is measured and evaluated by means of the evaluation 12 and display device 39. For this purpose again a specific diagnostic partial range can advantageously be available.

Operational testing of the sensor 23 can be carried out within the framework of a machine check, manually, cyclically or upon the presence of specific parameters such as "threshing mechanism stopped", "cutting mechanism raised" and "no throughput" among others, and may be undertaken by means of the attachment of a plurality of sensors 23 on one machine simultaneously or in a predetermined sequence.

If the diagnostic mode is selected, then the necessary diagnostic partial range of the evaluation device is automatically selected. The result of diagnosis is displayed via the conventional display unit 39 or via a separate diagnostic display. When there are a plurality of sensors 23 in a machine, the test results can be displayed via a common display with corresponding sensor 23 identification or in parallel via a plurality of display units.

Furthermore, a method of evaluating sensor 23 signals is proposed, in that the sensor 23 signals are corrected by a magnitude specific to the harvested material. It is known in the art to correct the sensor 23 signals in accordance with the grain size of the harvested material, the type of harvested material and the traveling speed of the harvesting machine. Prediction of the grain size, type of grain and traveling speed only indirectly represent the magnitudes which have an influence on the sensor 23 signal. The size or type of harvest material only has an indirect effect on the mass 5, which has an influence on the stimulation of the pulse detector 32, from the individual grains of harvested material. Therefore the system incorporates a magnitude specific to the harvested material, such as the weight per 1,000 grains or the hectoliter weight, into the evaluation of the sensor 23 signals supplied by a weight measuring means 42.

In addition, the moisture of the harvested material has an influence on the sensor 23 signals generated by the grains of harvested material. Harvested materials with high moisture generate a lower sensor 23 signal than harvested material with a lower moisture content. Therefore the moisture of the harvested material supplied by a moisture content measuring means 43, also is incorporated into the evaluation of the sensor 23 signals.

In order to most accurately predict the extent of losses of harvested material, the throughput of harvested material through the harvesting machine is also be taken into account in the evaluation. Incorporation of the traveling speed into the correction calculation permits this only in the exceptional cases where the height of the harvest yield is constant. Therefore the throughput of harvested material is incorporated into the evaluation of sensor 23 signals, and thus to obtain information regarding the relative harvesting loss.

Other objects, features and advantages will be apparent to those skilled in the art. While preferred embodiments of the present invention have been illustrated and described, this has been by way of illustration and the invention should not be limited except as required by the scope of the appended claims.

We claim:

1. In a harvesting machine for harvesting agricultural crops and having a threshing mechanism and a separating mechanism, sensing means for monitoring the threshing and separating performance and harvesting losses including a pulse detector and a vibration sensor, the improvement comprising: a detachable connection between the pulse detector and the vibration sensor, the vibration sensor including a sleeve having a surface communicating with the pulse detector and a bore for receiving the detachable connection, and the vibration sensor including a piezoelectric element circumjacent the sleeve and isolated from the detachable connection.

2. A harvesting machine according to claim 1, wherein the detachable connection is a screw.

3. A harvesting machine according to claim 1, wherein said pulse detector is a generally plate-shaped pulse detector.

4. A harvesting machine according to claim 3, wherein said plate-shaped pulse detector has a coupling point for attaching the vibration sensor, and including a material reinforcement in the area of the coupling point.

5. A harvesting machine according to claim 1, wherein said pulse detector is a generally cylindrical pulse detector.

6. A harvesting machine according to claim 5, wherein said pulse detector has a coupling point by which the pulse detector can be connected to the vibration sensor.

7. A harvesting machine according to claim 5, including a screw connection for securing said vibration sensor to the cylindrical pulse detector.

8. A harvesting machine according to claim 1, including a structural part cooperating with the detachable connector for connecting said pulse detector to the vibration sensor.

9. A harvesting machine according to claim 8, wherein said pulse detector is a generally cylindrical pulse detector having a longitudinal axis, and wherein the structural part comprises a receiving means for the cylindrical pulse detector, the structural part having a bore vertical to the longitudinal axis of the pulse detector.

10. A harvesting machine according to claim 1, including an electronic evaluation system connected with said vibration sensor.

11. A harvesting machine according to claim 1, including evaluation, display and operational testing units.

12. A harvesting machine according to claim 11, including a communication network for allowing said evaluation, display and operational testing units to communicate with one another.

13. A harvesting machine according to claim 12, wherein said evaluation, display and operational testing units communicate via a bus system.

14. A harvesting machine according to claim 1, including a device for operational testing of the sensing means and having an evaluating unit with a diagnostic partial range, in which the vibrations of the pulse detector are measured upon a specific stimulation of the pulse detector.

15. A harvesting machine according to claim 14, wherein said operational testing is carried out in a selected condition of the harvesting machine.

16. A harvesting machine according to claim 14, including means for storing said measured vibrations and comparing them with a desired vibration range.

17. A harvesting machine according to claim 16, including means for generating an error message when said vibrations fall outside the desired vibration range.

18. A harvesting machine according to claim 14, wherein said operational testing is triggered by the presence of selected operational parameters of the harvesting machine.

19. A harvesting machine according to claim 14, including a plurality of sensors on the harvesting machine, and wherein the operational testing is carried out simultaneously on the sensors.

20. A harvesting machine according to claim 14, including a plurality of sensors on the harvesting machine, and wherein the operational testing on the sensors is carried out according to a preselected sequence.

21. A harvesting machine according to claim 1, wherein the sensing means includes means for generating a signal, and including a device for evaluating the signal which takes into account a parameter of the harvested crop, including the type of harvested crop and the grain size of the harvested crop.

22. A harvesting machine according to claim 21, including means for measuring the moisture content of the harvested crop and feeding the same to the evaluating device, and wherein the evaluating device evaluates the sensor signal in consideration thereof.

23. A harvesting machine according to claim 21, including means for measuring the weight of a selected portion of the harvested crop and feeding the same to the evaluating device, and wherein the evaluating device evaluates the sensor signal in consideration thereof.

24. In a harvesting machine for harvesting agricultural crops and having a threshing mechanism and a separating mechanism, the improvement comprising: a sensor for monitoring the threshing and separating performance and harvesting losses and including a pulse detector and a piezoelectric vibration sensor with means for communicating said piezoelectric vibration sensor with the pulse detector and a detachable connection between the pulse detector and piezoelectric vibration sensor; a device for operational testing of the sensor and having an evaluating unit with a diagnostic partial range, in which the vibrations of the pulse detector are measured upon a specific stimulation of the pulse detector; and a pulse emitter attached to the pulse detector, and wherein said stimulation is generated by the pulse emitter.

25. In a harvesting machine for harvesting agricultural crops and having a threshing mechanism and a separating mechanism, the improvement comprising: a sensor for monitoring the threshing and separating performance and harvesting losses and including a pulse detector and a piezoelectric vibration sensor with means for communicating said piezoelectric vibration sensor with the pulse detector and a detachable connection between the pulse detector and piezoelectric vibration sensor; a device for operational testing of the sensor and having an evaluating unit with a diagnostic partial range, in which the vibrations of the pulse detector are measured upon a specific stimulation of the pulse detector; and a pulse emitter attached to the piezoelectric vibration sensor, and wherein said stimulation is generated by the pulse emitter.

* * * * *